Aug. 1, 1933.     A. G. F. WALLGREN     1,920,725
BEARING
Filed Nov. 14, 1931     2 Sheets-Sheet 1

INVENTOR
August Gunnar Ferdinand Wallgren
BY
Nº T. Hedlund
his ATTORNEY

Aug. 1, 1933. A. G. F. WALLGREN 1,920,725
BEARING
Filed Nov. 14, 1931 2 Sheets-Sheet 2

INVENTOR
August Gunnar Ferdinand Wallgren
BY
ATTORNEY

Patented Aug. 1, 1933

1,920,725

UNITED STATES PATENT OFFICE 1,920,725

BEARING

August Gunnar Ferdinand Wallgren, Stockholm, Sweden, assignor to Aktiebolaget Nomy, Stockholm, Sweden, a Corporation of Sweden Application November 14, 1931, Serial No. 574,939, and in Sweden November 14, 1930

23 Claims. (Cl. 308—73)

The present invention relates to bearings of the type including a plurality of tiltable blocks. The principal object of the invention is to provide a reversible bearing of this general type which is efficient in operation, in which the blocks cannot assume incorrect positions, and in which reversing is obtained in a simple, reliable manner.

An outstanding feature of the invention is that the blocks are pivoted perpendicularly or angularly with respect to the surface on which they shift, and that the blocks are caused to turn about pivots due to inequalities of friction resulting from the nature of the structure.

The nature of the invention and the advantages thereof will become apparent from a consideration of the following description taken in conjunction with the accompanying drawings forming a part of this specification and of which:

Figure 1:
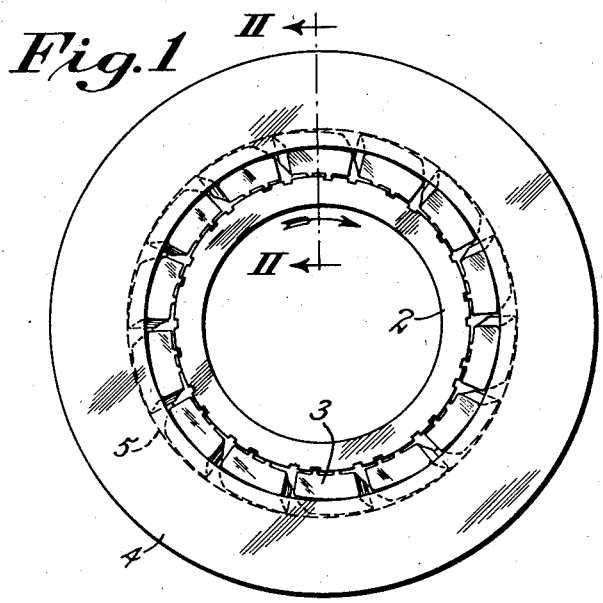
Fig. 1 is an end elevational view of a radial bearing embodying the invention.
Figure 2:
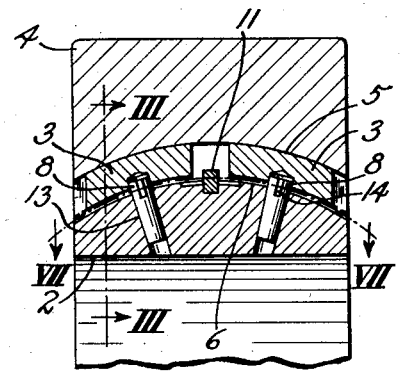
Fig. 2 is a sectional view taken on the line II—II of Fig. 1.

In the structure shown in Figs. 1 to 8, reference character 2 designates an inner ring member which is adapted to be secured, by shrinkage, keying or otherwise, to the shaft to be journalled in the bearing and to rotate therewith. An outer ring or bearing bowl 4 is normally the stationary part of the bearing and is mounted in any suitable manner. Between the members 2 and 4 is a plurality of bearing blocks 3. The radially outer surfaces of the blocks 3 are spherical and the inner surface of the member 4 is likewise spherical, as shown in Figs. 1 and 2. The outer surface 6 of member 2 is likewise spherical, but is provided with grooves, pivot holes and a center projection, presently to be described. The outer spherical surface 6 is the contact or bearing surface for the blocks.

In pivot holes 13 in ring member 2 are pivot pins 8. These pivot pins extend into holes 9 in the blocks 3 and the blocks are pivotally mounted on the pins 8. The arrangement is preferably such that the pins 8 are normal to the outer surface 6 of the member 2 and the holes 9 in the blocks which receive the pivot pins are at or substantially at the center of gravity of the blocks.

Figure 6:
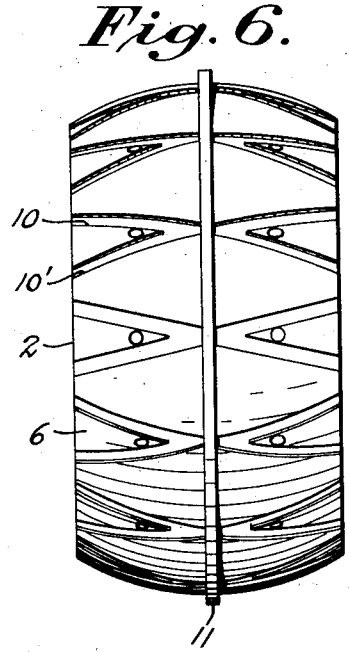
Fig. 6 shows a rotatable ring member the outer surface of which is the positioning surface for the bearing blocks.
Figure 7:
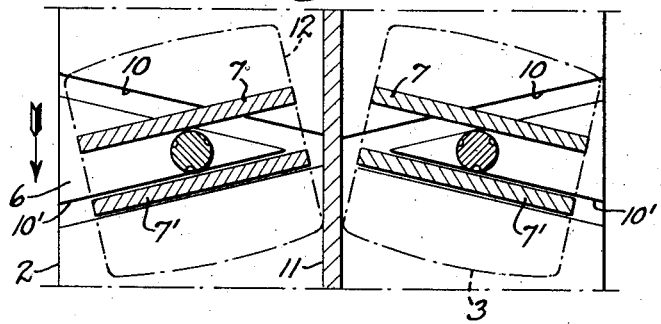
Figs. 7 and 8 show different positions of the blocks, the views being taken on the line VII—VII of Fig. 2 or Fig. 5.
Figure 8:
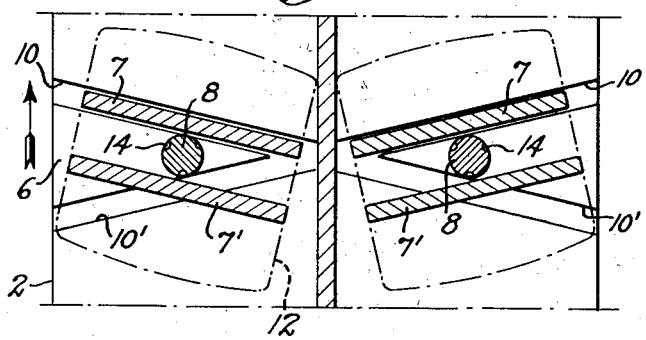

Each block is provided, to either side of the hole 9, with parallel ridges or bearing shoulder projections 7 and 7'. Grooves 10 and 10' are provided on the spherical surface 6 of the ring member 2. The grooves 10 and 10' are arranged in pairs, one pair for each bearing block. In each pair, the grooves 10 and 10' are at an angle to each other and they are also arranged to either side of the pivot pin. A ring 11 is set into and constitutes a projection from member 2. It extends peripherally and centrally around member 2. This ring 11 acts as an abutment for the blocks in their pivoting about the pins 8. Obviously, the ring 11 may be integral with the ring member 2. Figs. 7 and 8 show how the ring 11 prevents the turning of the blocks beyond a certain angle. In Figs. 6, 7 and 8, the outer edges of the blocks are designated by dash-and-dot lines. The pins 8 are preferably tapered and fit into tapered holes 13 and are furthermore provided with channels 14, the purpose of which is to permit oil accumulated in the holes 9 to have egress so that the blocks can properly set down onto the pins 8.

Figure 3:
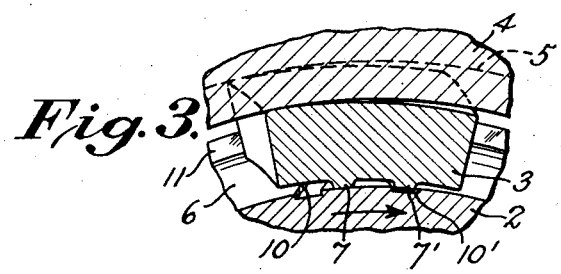
Fig. 3 shows one of the bearing blocks together with parts of the elements adjacent the same, the view being taken, in section, on the line III—III of Fig. 2.
Figure 4:
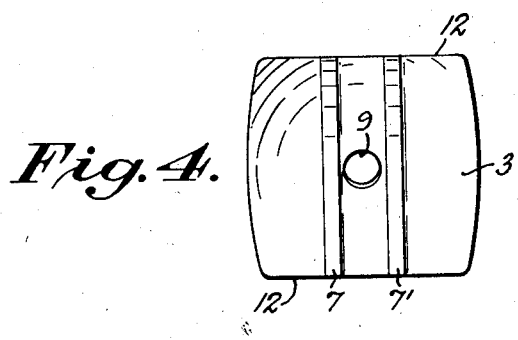
Fig. 4 is a view of one of the bearing blocks looking radially outward toward the same, with respect to its operative position.
Figure 5:
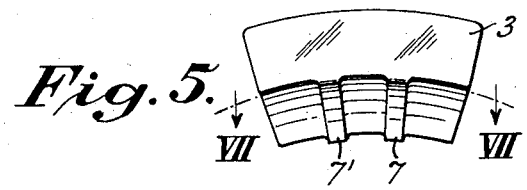
Fig. 5 is a perspective view of one of the bearing blocks.

The bearing functions as follows:

Assume that the shaft and the inner ring 2 are rotating in the direction shown by the arrows in Figs. 1, 3 and 7. The position of the blocks will be as shown in these figures. A turning moment acts on the blocks, as will be more clearly described below, to turn the blocks around the pivot pins 8 so that the forward part of the inside edge 12 abuts against the ring 11. In this position, the ridges 7' are in registry with grooves 10', as shown in Fig. 7, and the ridges 7' therefore enter the grooves 10'. The ridges 7, on the other hand, that is, the rearward ridges, with respect to the direction of rotation, are at an angle to the grooves 10 and rest on the surface 6. Consequently, the forward end of each block is radially inward with respect to the rear end and the blocks are tilted to provide the wedge-shaped oil film. The blocks are supported by the ridges 7 bearing on the surface 6, and it will thus be seen that the support, at least, the major portion thereof, is behind the center line or center of gravity of the blocks. It will be understood that the films are of increasing thickness considered from the rear toward the forward ends of the blocks.

The pivot pins 8 serve the additional function of carrying the blocks along with the ring member 2. In order to permit the tilting of the blocks, the pivot pins 8 are preferably of slightly less diameter than the holes 9, providing a slight play.

When the direction of rotation is reversed, a change of position of the blocks takes place and the blocks move to the positions shown in Fig. 8. The arrow at the left-hand side of Fig. 8 shows the direction of rotation. When the rotation ceases after movement in the direction indicated in Fig. 7, the blocks rise at the front ends so that the ridges 7' come up out of the grooves 10'. On reversal, the blocks turn about the pivot pins 8 until those edges which were previously the rear edges of the inside surface 12 contact the abutment strip 11. In this new position of the blocks, the ridges 7 register with the grooves 10 and enter the same, while the ridges 7' are raised onto the surface 6 and are disposed obliquely with respect to the grooves 10'.

The adjusting movement of the blocks, at reversal, to the proper respective positions, is due to the fact that they are subject to turning moments about the pins 8, the turning moments being due to different degrees of friction between the blocks and the surface 5 of the member 4, on the two sides, respectively, axially, of the pivot pin 8. In view of the spherical form of the surface 5, the distance from the center of rotation to the friction area between the blocks and the surface 5 is greater at the center than at the ends of the bearing. The radial distance from the center of rotation decreases from the plane of the member 11 axially in each direction, that is, toward the ends. Consequently, the average distance from the center of rotation to the friction areas between the blocks and the surface 5 is different, with respect to any block, on the two sides, axially, of the pivot pin 8. The average relative speed between the blocks and the surface 5 is therefore different on the two sides, axially, of the pivot pin 8, and the friction is greater as the speed is greater. Therefore, in either direction of rotation, there is a tendency for greater drag of the more remote radial portion and consequently a tendency for the less radially distant portion to move forward. It will be understood that, by a suitable arrangement of the pivot pins 8 in the blocks, the turning moment, that is to say, the product of the friction forces between the sliding surfaces of the blocks and the bearing, and the distance of these forces to the center of rotation, which tends to turn the blocks around the pivot pins in one direction, may be made greater than the turning moment operating on the other side in the opposite direction. The difference between these two turning moments constitutes the moment which has the power to turn the blocks. The pivot pins 8 may be, and preferably are, as above stated, centrally disposed with respect to the blocks. With this arrangement there is not a great difference in friction forces axially on the two sides of the pivot pin, but the different distances of the friction forces from the center of rotation gives sufficient difference in friction to cause the turning, while at the same time this provides the advantage that influences upon the adjustment of the blocks, as a result of a turning moment caused by the weight of the blocks around the pins 8, are wholly eliminated, whereby an improper displacement of the blocks with regard to member 2 is prevented. That is to say, there are certain unloaded positions wherein the blocks might swing improperly if they were off center with regard to their weight. The pins may be somewhat displaced from center position since the weight moment tending to turn the blocks is small if the distance between the center of gravity of the blocks and the center of rotation is small, compared with the frictional turning moment. By placing the pins 8 a little to one side of the center of gravity of the blocks and in the direction toward which the distance of the block slide surface to the center of rotation is reduced, there will be obtained, besides the above mentioned difference in distance to the center of rotation, greater friction forces on one side due to the greater area, which contribute to increase the turning moment. Under certain load conditions, for example, if the upper portion of the bearing is loaded, a moment caused by the weight of the blocks cannot jeopardize the correct operation of the bearing. In such a case the weight of the blocks may be made to facilitate the turning by placing the pins sufficiently far from the center of gravity of the blocks.

The turning of the blocks about the pivot pins 8 for the purpose of changing supporting surface in connection with the reversal of the direction of rotation, or the starting of the bearing, is accomplished when the blocks are in unloaded zones. In a normal bearing the blocks pass alternately through loaded and unloaded zones. Possibly at the beginning of any start in either direction, one or more blocks will be tilted the wrong way or will not be tilted. But as soon as such block passes into the zone of no load, it will assume its correct position due to the turning moment above described.

Figure 9:
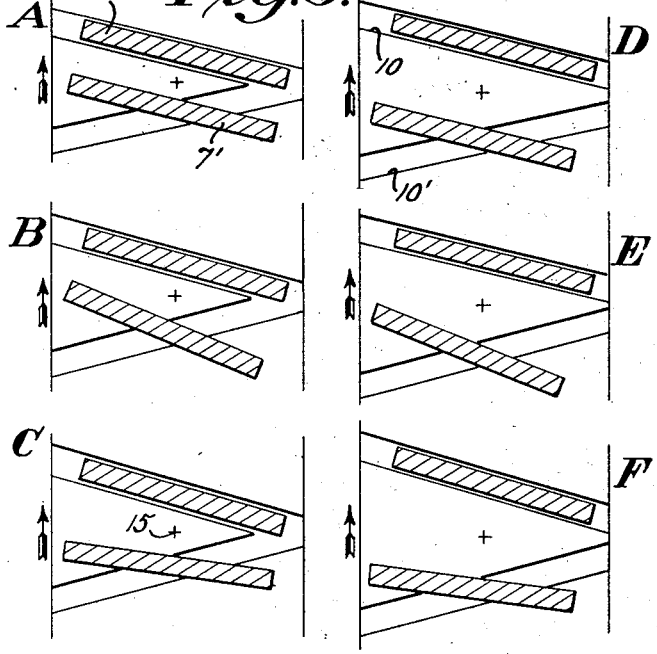
Fig. 9 shows different forms of bearing surfaces for the blocks, the views being in general analogous to those of Figs. 7 and 8.

Fig. 9 illustrates various possibilities of construction of the grooves 10, 10' and the ridges 7, 7'. At A, the grooves are angularly disposed so as to intersect at a point inside the radial projection of the peripheral block area while the ridges are parallel. This is the arrangement of the structure shown in Figs. 1—8. The ridges may, however, be disposed at an angle to each other, as shown at B and C. At B, the grooves converge in one direction while the ridges converge in the opposite direction. At C, the ridges and grooves converge in the same direction. The arrangements shown at D, E, and F are similar to those shown at A, B, and C, respectively, differing in that the grooves intersect outside the radially projected block area.

Figure 10:
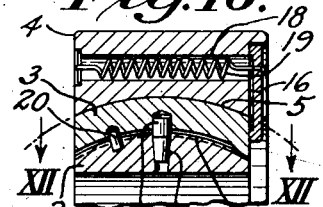
Fig. 10 is a sectional view taken on the line X—X of Fig. 11 or Fig. 12, showing a modified form of the invention.
Figure 11:
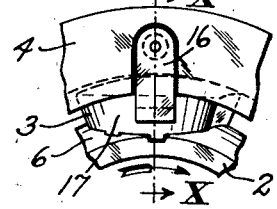
Fig. 11 is an end view of the structure shown in Fig. 10.
Figure 12:
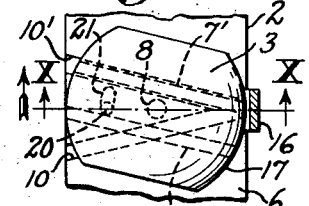
Fig. 12 is taken on the line XII—XII of Fig. 10.

Instead of utilizing friction forces between the blocks and the surface 5 to obtain adjustment of the blocks on reversal, the friction force may be separately produced, as illustrated in Figs. 10 to 12. This embodiment is a single-row block bearing. The pivot pins 8 are disposed at the center of gravity of the blocks and therefore any influences due to weight of the blocks are eliminated. In view of this structural arrangement, the friction forces on the two sides, axially, of the pivot pin, neutralize each other so that these forces cannot turn the blocks about the pivot pins 8. The turning of the blocks is accomplished by means of friction elements 16 which bear against the sides of the blocks. Friction elements 16 are held in place by being secured to springs 19 secured and arranged in bores 18 in the outer member 4. The side edges 17 of the blocks, as shown in Fig. 12, are of cylindrical surface with the center of curvature coincident with the axes of pivot pins 8 so that the blocks may turn without changing the position of the friction elements 16. When, after reversal, a block passes a member 16 in an unloaded zone, the friction between member 16 and surface 17 produces a turning moment about pivot pin 8 which causes turning of the block to the proper position for the changed direction of rotation. It will be understood that the friction elements 16 are placed in the less loaded or non-loaded zone where they are capable of causing the turning of the blocks because of the freedom of the latter. In order to assure correct functioning of the bearing without special mounting on assembly, for example, in a bearing box, it may be advisable to provide two or more friction elements around the periphery of the bearing bowl 4 so that, disregarding existing load conditions, at least one friction element is in an unloaded zone.

The extent of turning movement of the blocks is limited by pins 20 or the like set into ring member 2 and which enter into arcuate grooves in the blocks, the length of such grooves determining the extent of movement. The grooves 10 and 10' and the ridges 7 and 7' are formed, arranged and cooperate in the same manner as above described.

Figure 13:
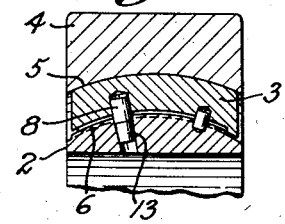
Fig. 13 shows still another form of the invention.

The embodiment shown in Fig. 13 also comprises a single row of blocks. In this embodiment, the pivot pins are arranged laterally of the blocks; that is, to one side of the center of gravity. This produces different friction forces axially to the sides of pins 8 which cause the turning. The side of greater area has the greater drag.

Figure 14:
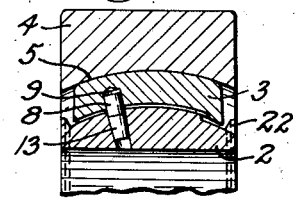
Fig. 14 shows still another modification.

Instead of limiting the turning movement of the blocks by pins and grooves, the sides of the blocks may be non-spherical and one or more abutment strips or members 22 may be provided, as shown in Fig. 14.

The invention is not limited to the structures above described, but may be embodied in a variety of other structures. The grooves 10, 10' may, instead of being formed in ring 2, be formed in the blocks, while the ridges may be on the member 2. The member 2, as a separate piece, is not essential, as the blocks may be supported directly on the shaft. In certain cases, as in crank shaft bearings, the blocks may be stationary.

What I claim is:

1. A bearing comprising relatively rotatable members, a plurality of bearing blocks having operative positions between said members, said blocks and one of said members having smooth cooperating surfaces, said blocks and the other of said surfaces having irregular cooperating surfaces for tilting the blocks, and means for mounting the blocks to have turning movement about axes intersecting the smooth and the irregular surfaces.

2. A bearing comprising a rotatable member, a stationary member, a plurality of bearing blocks having operative positions therebetween, said blocks and said stationary member having smooth cooperating surfaces, said rotatable member having a generally peripheral surface with irregularities therein, said blocks having surface irregularities for cooperating with said peripheral surface to tilt the blocks, and means for mounting the blocks to have turning movement on axes angularly disposed to said peripheral surface.

3. A bearing comprising a rotatable member, a stationary member, a plurality of bearing blocks having operative positions therebetween, said blocks and said stationary member having smooth cooperating surfaces, said rotatable member having a generally peripheral surface with irregularities therein, said blocks having surface irregularities for cooperating with said peripheral surface to tilt the blocks, means for mounting the blocks to have turning movement on axes angularly disposed to said peripheral surface, and means to limit the turning of the blocks.

4. A bearing comprising a rotatable member, a stationary member, a plurality of bearing blocks having operative positions therebetween, said blocks and said stationary member having smooth cooperating surfaces, said rotatable member having a generally peripheral surface with irregularities therein, said blocks having surface irregularities for cooperating with said peripheral surface to tilt the blocks, and means for mounting the blocks to have turning movement on axes perpendicular to said peripheral surface.

5. A bearing comprising a rotatable member, a stationary member, a plurality of bearing blocks having operative positions therebetween, said blocks and said stationary member having smooth cooperating surfaces, said rotatable member having a generally peripheral surface with irregularities therein, said blocks having surface irregularities for cooperating with said peripheral surface to tilt the blocks, and pivot pins secured to said rotatable member and extending into said blocks for permitting turning of said blocks on said peripheral surface.

6. A bearing comprising a rotatable member, a stationary member, a plurality of bearing blocks having operative positions therebetween, said blocks and said stationary member having smooth cooperating surfaces, said rotatable member having a generally peripheral surface with irregularities therein, said blocks having surface irregularities for cooperating with said peripheral surface to tilt the blocks, pivot pins secured to said rotatable member perpendicular to said peripheral surface and extending into said blocks for permitting turning of said blocks on said peripheral surface, and abutment means extending from said peripheral surface to limit turning of said blocks.

7. In a bearing of the type having a plurality of tiltable blocks operative between peripheral surfaces one of which is smooth and the other irregular, that improvement which consists in pivotally mounting the blocks on the irregular surface so as to have unbalanced areas of frictional contact with the smooth surface laterally of the pivot points and utilizing unbalanced friction forces laterally of the pivot points for turning the blocks to shift them between alternative tilt positions.

8. In a bearing of the type having a plurality of tiltable blocks operative between peripheral surfaces one of which is smooth and the other irregular, that improvement which consists in pivotally mounting the blocks on the irregular surface so as to have unbalanced areas of frictional contact with the smooth surface laterally of the pivot points and utilizing unbalanced friction forces produced between the blocks and the smooth peripheral surface laterally of the pivot points for turning the blocks to shift them between alternative tilt positions.

9. A bearing comprising a rotatable member, a stationary member, a plurality of bearing blocks having operative positions therebetween, said blocks and one of said members having smooth cooperating surfaces, said blocks and the other of said members having irregular cooperating surfaces providing ridges and grooves for tilting the blocks, and means for mounting the blocks to have turning movement about axes intersecting the smooth and the irregular surfaces.

10. A bearing comprising a rotatable member, a stationary member, a plurality of bearing blocks having operative positions therebetween, said blocks and said stationary member having smooth cooperating surfaces, said rotatable member having a generally peripheral surface with grooves therein, said blocks having ridges for cooperating with said peripheral surface to tilt the blocks, and means for mounting said blocks to turn on axes angularly disposed to said peripheral surface.

11. A bearing comprising a rotatable member, a stationary member, a plurality of bearing blocks having operative positions therebetween, said blocks and said stationary member having smooth cooperating surfaces, said rotatable member having a generally preipheral surface with obliquely disposed grooves therein, said blocks having parallel ridges for cooperating with said peripheral surface to tilt the blocks, means for mounting the blocks to have turning movement on axes angularly disposed to said peripheral surface, and means to limit the turning of the blocks.

12. A bearing comprising a rotatable member, a stationary member, a plurality of bearing blocks having operative positions therebetween, said blocks and said stationary member having smooth cooperating surfaces, said rotatable member having a generally peripheral surface with grooves therein, said blocks having ridges for cooperating with said peripheral surface to tilt the blocks, and means for mounting the blocks to have turning movement on axes perpendicular to said peripheral surface.

13. A bearing comprising a rotatable member, a stationary member, a plurality of bearing blocks having operative positions therebetween, said blocks and said stationary member having smooth cooperating surfaces, said rotatable member having a generally peripheral surface with grooves therein, said blocks having ridges for cooperating with said peripheral surface to tilt the blocks, and pivot pins secured to said rotatable member and extending into said blocks for permitting turning of said blocks on said peripheral surface.

14. A bearing comprising a rotatable member, a stationary member, a plurality of bearing blocks having operative positions therebetween, said blocks and said stationary member having smooth cooperating surfaces, said rotatable member having a generally peripheral surface with grooves therein, said blocks having ridges for cooperating with said peripheral surface to tilt the blocks, pivot pins secured to said rotatable member perpendicular to said peripheral surface and extending into said blocks for permitting turning of said blocks on said peripheral surface, and abutment means extending from said peripheral surface to limit turning of said blocks.

15. In a bearing of the type having a plurality of tiltable blocks operative between peripheral surfaces one of which is smooth and the other irregular, that improvement which consists in pivotally mounting the blocks on the irregular surface so as to have unbalanced areas of frictional contact with the smooth surface laterally of the pivot points, utilizing unbalanced friction forces laterally of the pivot points for turning the blocks to shift them between alternative tilt positions, and limiting the turning movement of the blocks.

16. In a bearing of the type having a plurality of tiltable blocks operative between peripheral surfaces one of which is smooth and the other irregular, that improvement which consists in pivotally mounting the blocks on the irregular surface so as to have unbalanced areas of frictional contact with the smooth surface laterally of the pivot points, utilizing unbalanced friction forces produced between the blocks and the smooth peripheral surface laterally of the pivot points for turning the blocks to shift them between alternative tilt positions, and limiting the turning movement of the blocks.

17. A bearing comprising relatively rotatable members, a plurality of bearing blocks having operative positions between said members, said blocks and one of said members having smooth cooperating surfaces extending generally oblique to the axis of rotation, said blocks and the other of said members having irregular cooperating surfaces providing alternative tilt positions, and means for mounting the blocks to have turning movement about axes intersecting the smooth and the irregular surfaces so that variations in friction due to the obliquity of the smooth surfaces can shift the blocks between alternative tilt positions.

18. A bearing comprising relatively rotatable members, a plurality of bearing blocks having operative positions between said members, said blocks and one of said members having smooth cooperating surfaces extending generally oblique to the axis of rotation, said blocks and the other of said members having irregular cooperating surfaces providing alternative tilt positions, means for mounting the blocks to have turning movement about axes intersecting the smooth and the irregular surfaces so that variations in friction due to the obliquity of the smooth surfaces can shift the blocks between alternative tilt positions, and means for limiting the turning movement of said blocks.

19. A bearing comprising relatively rotatable members, a plurality of bearing blocks having operative positions between said members, said blocks and one of said members having smooth cooperating substantially spherical surfaces extending generally oblique to the axis of rotation, said blocks and the other of said members having irregular cooperating surfaces providing alternative tilt positions, and means for mounting the blocks to have turning movement about axes intersecting the smooth and the irregular surfaces so that variations in friction due to the obliquity of the smooth surfaces can shift the blocks between alternative tilt positions.

20. A bearing comprising relatively rotatable members, a plurality of bearing blocks having operative positions between said members, said blocks and one of said members having smooth cooperating substantially spherical surfaces extending generally oblique to the axis of rotation, said blocks and the other of said members having irregular cooperating surfaces providing alternative tilt positions, means for mounting the blocks to have turning movement about axes intersecting the smooth and the irregular surfaces so that variations in friction due to the obliquity of the smooth surfaces can shift the blocks between alternative tilt positions, and means to limit the turning movement of said blocks.

21. A bearing comprising relatively rotatable members, a plurality of rows of bearing blocks having operative positions between said members, said blocks in each row and one of said members having smooth cooperating surfaces extending g nerally oblique to the axis of rotation, the obliquity being opposite in the different rows, said blocks and the other of said members having irregular cooperating surfaces providing alternative tilt positions, and means for mounting the blocks to have turning movement about axes intersecting the smooth and the irregular surfaces so that variations in friction due to the obliquity of the smooth surfaces can shift the blocks between alternative tilt positions.

22. A bearing comprising relatively rotatable members, a plurality of rows of bearing blocks having operative positions between said members, said blocks in each row and one of said members having smooth cooperating surfaces extending generally oblique to the axis of rotation, the obliquity being opposite in the different rows, said blocks and the other of said members having irregular cooperating surfaces providing alternative tilt positions, means for mounting the blocks to have turning movement about axes intersecting the smooth and the irregular surfaces so that variations in friction due to the obliquity of the smooth surfaces can shift the blocks between alternative tilt positions, and means to limit the turning movement of the blocks.

23. A bearing comprising relatively rotatable members, a plurality of bearing blocks having operative positions between said members, said blocks and one of said members having smooth cooperating surfaces, said blocks and the other of said surfaces having irregular cooperating surfaces for tilting the blocks, and means for mounting the blocks to have turning movement about axes different from the axes of tilting.

AUGUST GUNNAR
FERDINAND WALLGREN.